(12) United States Patent
Katz et al.

(10) Patent No.: US 11,349,243 B2
(45) Date of Patent: May 31, 2022

(54) HIGH POWER CONTACT SOCKET

(71) Applicant: Amphenol-Tuchel Electronics GmbH, Heilbronn (DE)

(72) Inventors: Wolfgang Katz, Leingarten (DE); Joachim Stolz, Besigheim (DE); Martin Wacker, Öhringen (DE)

(73) Assignee: AMPHENOL-TUCHEL ELECTRONICS GMBH, Heilbronn (DE)

( * ) Notice: Subject to any disclaimer, the term of this patent is extended or adjusted under 35 U.S.C. 154(b) by 601 days.

(21) Appl. No.: 16/324,879

(22) PCT Filed: Jul. 26, 2017

(86) PCT No.: PCT/EP2017/068902
§ 371 (c)(1),
(2) Date: Feb. 11, 2019

(87) PCT Pub. No.: WO2018/028991
PCT Pub. Date: Feb. 15, 2018

(65) Prior Publication Data
US 2021/0328375 A1 Oct. 21, 2021

(30) Foreign Application Priority Data

Aug. 12, 2016 (DE) ..................... 10 2016 114 980.2

(51) Int. Cl.
*H01R 13/187* (2006.01)
*H01R 13/11* (2006.01)
(Continued)

(52) U.S. Cl.
CPC ......... *H01R 13/187* (2013.01); *H01R 13/111* (2013.01); *H01R 43/16* (2013.01); *H02K 5/161* (2013.01)

(58) Field of Classification Search
CPC .... H01R 13/111; H01R 13/187; H01R 43/16; H02K 5/161
(Continued)

(56) References Cited

U.S. PATENT DOCUMENTS 1,833,145 A * 11/1931 Wilhelm .............. H01R 13/193
439/835
4,203,647 A * 5/1980 Bonhomme ........... H01R 13/33
439/851
(Continued)

FOREIGN PATENT DOCUMENTS

DE         100 05 297 A1    8/2001
DE    20 2016 102358 U1    5/2016
(Continued)

*Primary Examiner* — Abdullah A Riyami
*Assistant Examiner* — Vladimir Imas
(74) *Attorney, Agent, or Firm* — Cantor Colburn LLP

(57) ABSTRACT

The invention relates to a flat sheet metal part for forming a cylindrically shaped contact cage with a receiving space for plugging in a contact in a plug-in direction Z, said sheet metal part comprising:
a. a base shape with four edges and four corner sections, of which two of the edges extend parallel to one another and each form a collar crosspiece extending in each case between two corner section;
b. a multitude of contact blades which connect the one collar crosspiece with the other collar crosspiece,
c. wherein each collar crosspiece comprises a protrusion which lengthens the collar crosspiece in the region of one respective corner section, and
d. wherein each collar crosspiece has a recess in the region of the respective other corner section.

8 Claims, 2 Drawing Sheets

(51) Int. Cl.
*H01R 43/16* (2006.01)
*H02K 5/16* (2006.01)

(58) Field of Classification Search
USPC .......................................................... 439/843
See application file for complete search history.

(56) References Cited

U.S. PATENT DOCUMENTS

| | | | | | |
|---|---|---|---|---|---|
| 4,657,335 | A * | 4/1987 | Koch | ................... | H01R 13/187 439/851 |
| 5,326,289 | A * | 7/1994 | Leisey | ................. | H01R 13/111 29/882 |
| 6,254,439 | B1 * | 7/2001 | Endo | .................... | H01R 13/187 439/843 |
| 6,656,002 | B2 * | 12/2003 | Zhao | ..................... | H01R 11/22 439/787 |
| 6,899,571 | B1 * | 5/2005 | Koch | .................... | H01R 4/4881 439/843 |
| 7,115,003 | B2 * | 10/2006 | Zhao | ..................... | H01R 13/187 439/851 |
| 7,387,532 | B1 * | 6/2008 | Mao | ..................... | H01R 13/187 439/263 |
| 7,462,078 | B2 * | 12/2008 | Mao | ..................... | H01R 13/187 439/843 |
| 7,736,194 | B1 * | 6/2010 | Chang | ................... | H01R 24/38 439/675 |
| 7,850,389 | B2 * | 12/2010 | Hanrahan | ............. | F16D 1/0835 403/372 |
| 8,162,672 | B2 * | 4/2012 | Huang | ................... | H01R 13/11 439/63 |
| 9,455,514 | B2 * | 9/2016 | Hirakawa | ............ | H01R 13/193 |
| 9,484,641 | B2 * | 11/2016 | Ohkubo | ............... | H01R 13/187 |
| 10,135,167 | B2 * | 11/2018 | Wollitzer | ............. | H01R 13/187 |
| 10,347,996 | B2 * | 7/2019 | Kung | ....................... | C25D 5/12 |
| 10,446,963 | B2 * | 10/2019 | Ungerer | .............. | H01R 13/111 |
| 10,535,943 | B2 * | 1/2020 | Szymura | ................ | H01R 43/16 |
| 10,594,105 | B2 * | 3/2020 | Kerner | ................ | H01R 13/187 |
| 10,950,964 | B2 * | 3/2021 | Uppleger | ............. | H01R 13/187 |
| 2003/0068931 | A1 * | 4/2003 | Swearingen | ......... | H01R 4/4881 439/843 |
| 2013/0171892 | A1 * | 7/2013 | Hachadorian | ........ | H01R 13/052 439/884 |
| 2014/0357137 | A1 * | 12/2014 | Sian | ..................... | H01R 13/187 439/843 |
| 2016/0254610 | A1 * | 9/2016 | Hirakawa | ............... | H01R 4/18 439/816 |
| 2020/0106231 | A1 * | 4/2020 | Katz | .................... | B21D 35/003 |

FOREIGN PATENT DOCUMENTS

| | | |
|---|---|---|
| DE | 10 2015 106 820 | 11/2016 |
| GB | 2 398 680 A | 8/2004 |
| WO | WO 2007/084085 | 7/2007 |
| WO | WO 2007/084086 A2 | 7/2007 |

* cited by examiner

HIGH POWER CONTACT SOCKET

BACKGROUND

The present invention relates to a high current terminal socket.

High current terminal sockets are for example known as radial terminal sockets or hyperbolic terminal sockets.

US 2002/0187686 A1 discloses a socket including a T-shaped connector and the production of a laminated contact consisting of a contact cage and a curled contact holder, which are twisted into an "hourglass shape" in a complex manner using various auxiliary means.

U.S. Pat. No. 4,657,335 A describes another socket which is formed by rotating the ends of a contact cage relative to each other into a sleeve. Annular rings are then slipped over the respective ends of the sleeve for fixing and fastening the contact cage in the sleeve.

An electrical connector comprising a substantially cylindrical sleeve with notches at its end faces for fastening a hyperbolically twisted contact cage with its contact blades on or in said notches is known from US 2003/0068931 A1.

Another electrical connector socket is known from DE 10 2011 105 821 B4. It discloses a cylindrical socket sleeve, wherein said sleeve is provided with a receiving space in which a hyperbolically twisted contact cage is attached and the socket sleeve has a first and a second end face, and wherein the contact cage with its contact blades is positively interlocked with the first and second end faces of the socket sleeve and wherein openings are provided in the transitional area between the socket sleeve and the contact blade and at least one of the contact blades of the contact cage projects through one of the openings.

However, all these solutions known from prior art have the disadvantage that the production of the terminal sockets takes a great effort, particularly because the geometrical dimensions and tolerances of sleeves and sleeve mesh or contact cage must be matched to one another, and there is an undesirable, production-related tolerance range which causes considerable practical assembly and application problems.

For simpler solutions, sleeves are alternatively produced in a rolling and bending process.

The "dovetail connections" known from prior art, which are used as connecting elements and molded to opposite side edges of a piece of sheet metal, make the production process expensive and are difficult to produce due to manufacturing tolerances. It is particularly necessary that the dovetail is exactly fitted into its respective mating contour to achieve stable support, and wherein a certain assembly clearance can lead to the end faces not being in flush alignment in the rolling and bending process, which creates an undesired step.

Such an exemplary dovetail connection is known, for example, from US 2002/0187686 A1. As explained above, producing a high-current contact element in accordance with the method shown there takes a great effort, is complicated and not economical. Furthermore, the desired exactly fitting end faces which would allow complete elimination of a sleeve enclosing the contact element are not achieved.

SUMMARY

It is therefore the problem of the present invention to overcome the disadvantages mentioned above and to manufacture a high-current terminal socket in a much simpler and more economical manner, wherein, on the one hand, the number of components can be reduced, and the desired manufacturing accuracy can be achieved on the other.

The invention is solved by a sheet metal part for forming a cylindrically shaped contact cage.

The invention is based on the concept that a sheet metal part which is preferably configured as a punched or bent part is provided, which part has a capturing geometry on side edges or side regions which guide the end-side edges of the contact cage to be formed into a desired, preferably completely flush position when the sheet metal part is formed into a contact cage.

According to the invention, respective capturing geometries in the form of protrusions and recesses which provide forced guidance into a contact cage during forming are provided on opposite side edges of the sheet metal part, which abut in its cylindrically shaped state.

According to the invention, a flat sheet metal part is provided for forming a cylindrically shaped contact cage with a receiving space for plugging in a contact in a plug-in direction Z, said sheet metal part comprising:

a. a base shape with four edges and four corner sections, of which two of the edges extend parallel to one another and each form a collar crosspiece extending in each case between two corner section;
b. a multitude of contact blades which connect the one collar crosspiece with the other (opposing) collar crosspiece,
c. wherein each collar crosspiece comprises a protrusion which lengthens the collar crosspiece in the region of the respective corner section, and
d. wherein each collar crosspiece has a recess in the region of the respective other corner section (that is, the opposing corner section), preferably a recess which matches the protrusion.

This has the advantage that the protrusion can plunge into the recess when the sheet metal part is bent or formed into a cylindrical contact cage shape and the edges of the protrusion form guide surfaces on the edge of the recess, which thus serve as a capturing geometry and force the contact cage into an overall desired final shape in which the end-side edges which run parallel to one another are in flush alignment, that is, without an offset in the plug-in direction.

Advantageously, the protrusion projects or protrudes from the corner section in the direction in which the collar crosspiece extends.

Further advantageously, the shape of the recess matches the shape of the protrusion, such that said protrusion projects into a cylindrically shaped contact cage when the sheet metal part is formed.

Further advantageously, the edge extends as follows in the region of the protrusion of the respective collar crosspiece: first linearly along the rim of the respective collar crosspiece, then in a curved manner around the respective protrusion in a bend of about 80° to 100°, preferably in a 90° bend.

Further advantageously, the curvature changes from the 180° bend into a curved bend of 90° in the opposite direction.

Further advantageously, the edges of the sheet metal part extend as follows in the region of the recess of the respective collar crosspiece: first linearly along the rim of the respective collar crosspiece, then in a curved manner in a bend of about 90° (in a first direction of curvature along the recess), then further in a bend of about 180° around while forming a protrusion.

The side edge of this latter protrusion can thus slide along the protrusion of the opposite corner section when the sheet metal part is formed into a cylindrically shaped contact cage.

Particularly advantageously, the edge comprises a linear oblique section in the region of the bend mentioned above, which section is directly opposite, or abuts with, a linear oblique section on the opposite edge in the region of the bend of about 90° which extends parallel to said first section.

In other words, the oblique sections mentioned above, which extend substantially parallel to each other and linearly, are provided in every corner section of the sheet metal part in the region of the capturing geometry and are used, on the one hand, for stiffening to avoid stress peaks, and on the other hand form exact abutment surfaces, which allows forming the sheet metal into a desired final shape at a minimal tolerance.

According to the invention, the protrusion further comprises an oblique section which extends about parallel to the linear oblique section of the edge in the region of the bend.

Another aspect of the present invention relates to a cylindrically shaped contact cage, which was formed from the sheet metal part mentioned above and forms a substantially cylindrically shaped receiving space which is constricted at its center.

Another aspect of the present invention relates to a sheet metal part as described above, which is characterized in that the protrusion next to the recess rests with its side edge that faces the rim in the region of the 90° bend against the opposite side edge of the protrusion.

It is further advantageous that the end-side opposite edge of this protrusion plunges into the recess, thereby forming an end-side gap.

In other words, the protrusion does not project to the opposite edge of the recess on its end side when the sheet metal part is rolled into a cylindrically shaped contact cage; instead, a gap is formed between the end-side edge on the protrusion and the edge on the recess.

BRIEF DESCRIPTION OF THE DRAWINGS

Other embodiments of the invention can be derived from the claims and figures and the associated description of the figures, wherein:

DETAILED DESCRIPTION

The invention is described below with reference to exemplary embodiments and to FIGS. 1 to 4, wherein the same reference symbols indicate same functional and/or structural features.

Figure 1:
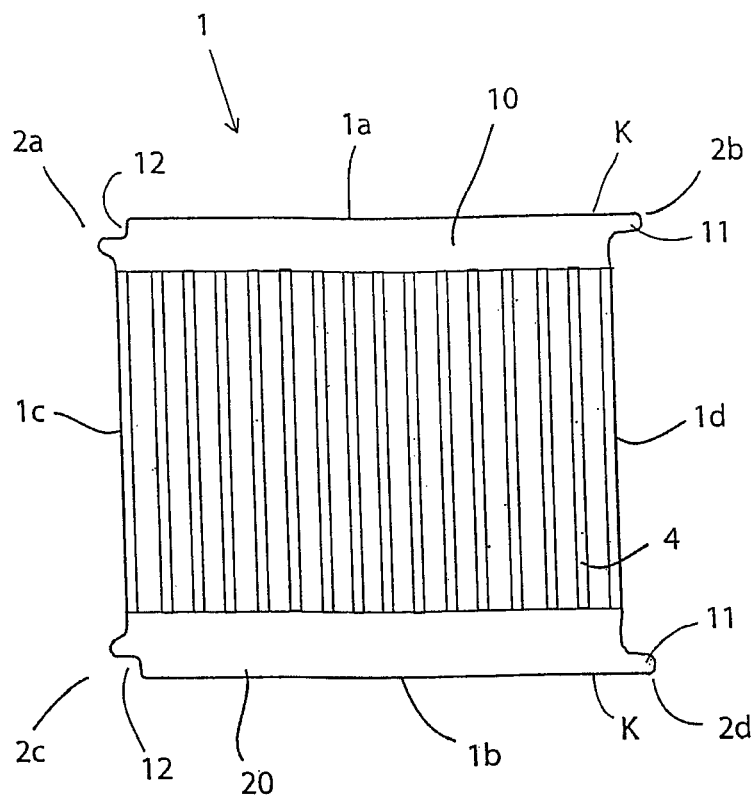
FIG. 1 shows a schematic plan view of an embodiment of a sheet metal part.

FIG. 1 shows a plan view of an unbent sheet metal part 1. The flat sheet metal part 1 has a rectangular base shape with edges 1a, 1b, 1c, 1d and four corner sections 2a, 2b, 2c, 2d. The two edges 1a, 1b extend parallel to one another. These edges 1a, 1b are the rims of the collar crosspieces 10, 20. The collar crosspieces 10, 20 extend between two corner sections 2a, 2b or 2c, 2d, respectively.

A multitude of contact blades 4 extend between the collar crosspieces 10, 20, which blades 4 connect the two collar crosspieces 10, 20.

Each collar crosspiece 10, 20 has a protrusion 11 lengthening the collar crosspiece in the region of the respective corner section 2a, 2c, which represents a part of the capturing geometry.

Furthermore, each collar crosspiece 10, 20 forms a respective recess 12 in the region of the respective other corner section 2b, 2d, which also represents a part of the capturing geometry according to the invention.

As is further visible, the front edge K of the sheet metal part 1 in the region of the collar crosspiece 10 is assigned the reference symbol K, and the rear edge of the collar crosspiece 20, i.e. the collar crosspiece located opposite the collar crosspiece 10, is also assigned the reference symbol K.

Figure 2:
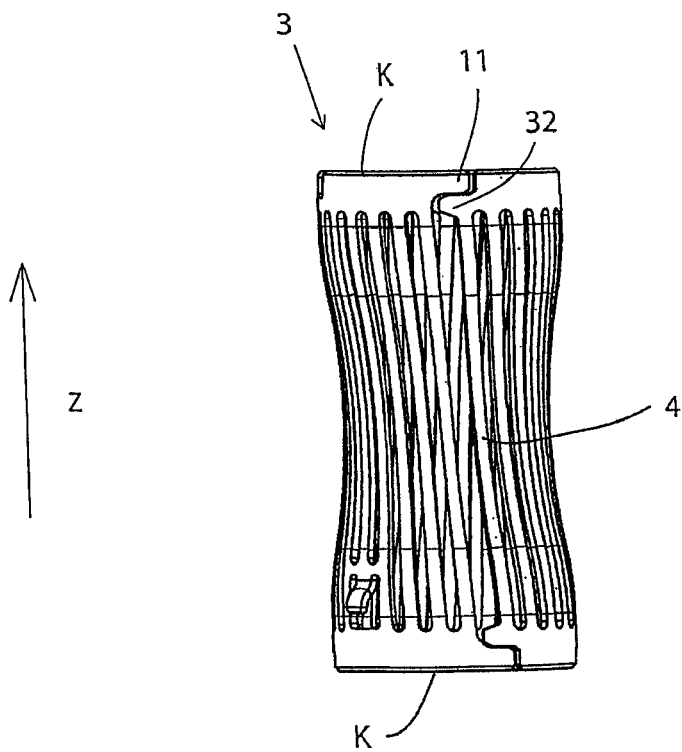
FIG. 2 shows a cylindrically shaped contact cage formed from a sheet metal part.
Figure 3:
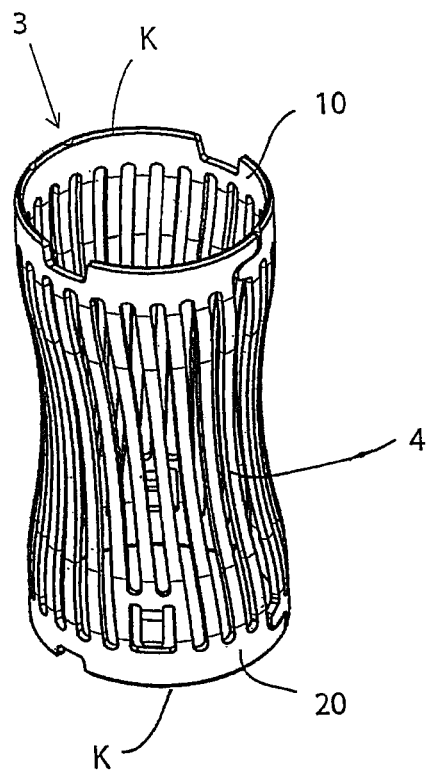
FIG. 3 shows a perspective view of the contact cage from FIG. 2.

FIGS. 2 and 3 show embodiments of a contract cage 3, which were formed, particularly rolled, from a sheet metal part 1 according to the invention. A receiving space 40 for plugging in a contact in the plug-in direction Z is formed in the contact cage 3.

As is well visible in FIG. 2, the front-side edge K extends on the first collar crosspiece 10 parallel to the end-side edge K on the second collar crosspiece 20 and particularly in one plane in the region of the capturing geometries in the corner sections 2a, 2b, 2c, 2d, therefore in flush alignment and without a step-like offset.

Figure 4:
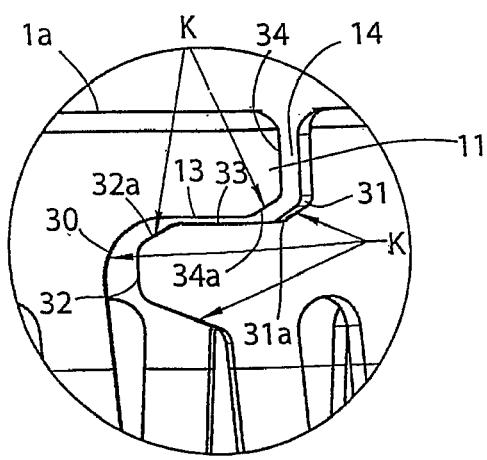
FIG. 4 shows a detail of the capturing geometry according to the invention of the embodiment from FIG. 2 and FIG. 3.

FIG. 4 shows a partial view one of the capturing geometries, which are formed from the protrusion 11 and the recess 12 and the other protrusion 32.

The edge profile K in the region of the protrusion 11 of the collar crosspiece 10 is described in more detail below. It first runs linearly along the edge 1a of the collar crosspiece 10, then in a curved manner around the respective protrusion 11 in a bend 34 of about 180°, and then again in a bend 30 of about 90° [it transitions] into the edge section of a contact blade 4.

It is further visible that the edge profile of the edge K extends as follows in the region of the recess 12 of the collar crosspiece 10. First linearly along the edge 1a of the collar crosspiece 10, then in a curved manner in a bend 31 of about 90° along the recess 12 and further in a bend of about 180° forming a protrusion 32, wherein the edge afterwards also transitions into the edge of a contact blade 4 in the present embodiment.

Furthermore, the linear oblique sections 31a, 34a can be seen, which extend parallel or substantially parallel to one another and are provided on the respective opposite edge K in the region of the bend 31 of about 90°.

It can further be seen that the protrusion 32 comprises an oblique section 32a which extends about parallel to the linear oblique section 34a of the edge K in the region of the bend 34. When rolling the sheet metal part together, the respective oblique sections 31a, 34a or the edges K of the capturing geometries abut, such that a desired end position of the edges 1a or 1c, respectively, is achieved.

Furthermore, as shown in FIG. 2 and FIG. 3, the cylindrically shaped contact cage 3 is constricted in or near its center.

In this state, the side edge 33 of the protrusion 32 which is facing in the direction of the edge 1a or 1c rests next to the recess 12 against the respective opposite side edge 13 of the edge K of the protrusion 11 in the region of the 90° bend 31.

The protrusion 11 plunges into the recess 12, forming an end-side gap 14 to the edge K located on the opposite end side.

The implementation of the invention is not limited to the preferred embodiments described above. Instead, a plurality of variants is conceivable in which the solution described is used for completely different designs.

LIST OF REFERENCE SYMBOLS

1 Sheet metal part
1a, 1b, 1c, 1d Edges
2a, 2b, 2c, 2d Corner sections
3 Contact cage
4 Contact blade
10 Collar crosspiece
11 Protrusion
12 Recess
13 Side edge
14 Gap
20 Collar crosspiece
30 90° bend
31 90° bend
31a Oblique section
32 Protrusion
32a Oblique section
33 Side edge
34 Bend
34a Oblique section
40 Receiving chamber
K Edge
Z Plug-in direction

The invention claimed is:

1. A flat sheet metal part for forming a cylindrically shaped contact cage with a receiving space for plugging in a contact in a plug-in direction, said sheet metal part comprising:
  a base shape with four edges and four corner sections, of which two of the edges extend parallel to one another and each form a collar crosspiece extending between two of the four corner sections;
  a multitude of contact blades, which connect the collar crosspieces,
  wherein each collar crosspiece comprises a first protrusion which lengthens the collar crosspiece in a region of one of the two corner sections, wherein each collar crosspiece comprises a recess in a region of the other of the two corner sections and the first protrusion projects into the recess,
  wherein at least one of the edges extends in a region of the first protrusion of the respective collar crosspiece: first linearly along the edge of the respective collar crosspiece, then in a curved manner around the respective first protrusion in a bend of about 180°, and then in a bend of about 90°,
  wherein the edges in a region of the recess of the respective collar crosspiece extend first linearly along the edge of the respective collar crosspiece, then in a curved manner in a bend of about 90° along the recess, then further in a bend of about 180° around it while forming a second protrusion, and
  wherein a side edge of the first protrusion which is facing in a direction of the edge of one of the collar crosspieces, rests next to the recess against a respective opposite side edge of the second protrusion which is facing in a direction of the edge of the other of the collar crosspieces, in the region of the 90° bend.

2. The sheet metal part according to claim 1, wherein the first and protrusions project projects from the corner sections in the extension direction of the collar crosspiece.

3. The sheet metal part according to claim 1, wherein the shape of the recess is configured to match the shape of the first protrusion, such that when said first protrusion projects into the recess, the sheet metal part is formed into a cylindrically shaped contact cage.

4. The sheet metal part according to claim 1, wherein the at least one edge comprises a linear oblique section in a region of the bend, which section is directly opposite, or abuts with, a linear oblique section on an opposite edge in a region of the bend of about 90°.

5. The sheet metal part according to claim 4, wherein the protrusion comprises an oblique section which extends about parallel to the linear oblique section of the at least one edge in the region of the bend.

6. The sheet metal part according to claim 3, wherein the cylindrically shaped contact cage forms a substantially cylindrical receiving space which is constricted at a center.

7. The sheet metal part according to claim 1, wherein the protrusion plunges into the recess, thereby forming an end-side gap with the at least one edge located opposite on the end side.

8. A sheet metal part for forming a cylindrically shaped contact cage with a receiving space for plugging in a contact in a plug-in direction, said sheet metal part comprising:
  a base shape with four edges and four corner sections, two edges of the four edges extend parallel to one another and form first and second collar crosspieces, respectively, extending between two of the four corner sections; and
  a multitude of contact blades, which connect the first and second collar crosspieces,
  wherein each the first and second collar crosspieces comprises a first protrusion which lengthens the respective collar crosspiece in a region of one of the two corner sections, each the first and second collar crosspieces comprises a recess in a region of the other of the two corner sections, and each first protrusion projects into the recess of the respective first and second collar crosspiece, such that the sheet metal part is formed into a cylindrically shaped contact cage, and
  wherein a side edge of the first protrusion which is facing in a direction the edge of one of the first and second collar crosspieces, rests next to the recess against a respective opposite side edge of the second protrusion which is facing in a direction of the edge of the other of the first and second collar crosspieces, in the region of the 90° bend.

* * * * *